(12) United States Patent
Samueli et al.

(10) Patent No.: US 6,498,823 B1
(45) Date of Patent: Dec. 24, 2002

(54) VARIABLE RATE MODULATOR

(75) Inventors: Henry Samueli, San Juan Capistrano, CA (US); Joseph I. Laskowski, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/570,238

(22) Filed: May 12, 2000

Related U.S. Application Data

(63) Continuation of application No. 08/948,101, filed on Oct. 9, 1997, now Pat. No. 6,144,712.

(51) Int. Cl.$^7$ ............................................. H04L 7/00
(52) U.S. Cl. ........................ 375/371; 375/306; 708/313
(58) Field of Search ..................... 375/371, 372, 375/306; 708/290, 251, 313, 303, 847; 327/164, 165, 172, 178, 295, 296; 331/18, 50, 46, 47

(56) References Cited

U.S. PATENT DOCUMENTS

| | | | |
|---|---|---|---|
| 5,412,352 A | 5/1995 | Graham | 332/103 |
| 5,479,457 A | 12/1995 | Waters | 375/372 |
| 5,500,892 A | 3/1996 | Essig | 379/345 |
| 5,519,732 A | 5/1996 | Chester | 375/295 |
| 5,606,319 A | 2/1997 | Yatim et al. | 341/144 |
| 5,625,646 A * | 4/1997 | Goodson et al. | 370/286 |
| 5,724,396 A * | 3/1998 | Claydon et al. | 375/355 |
| 5,748,126 A | 5/1998 | Ma et al. | 341/143 |
| 5,764,113 A * | 6/1998 | Snell | 332/103 |
| 5,768,328 A | 6/1998 | Nielson | 375/376 |
| 5,783,974 A | 7/1998 | Koslov et al. | 332/103 |
| 5,828,710 A * | 10/1998 | Beale | 375/344 |
| 5,943,369 A * | 8/1999 | Knutson et al. | 375/326 |
| 5,978,420 A * | 11/1999 | Koslov et al. | 375/295 |
| 6,041,088 A * | 3/2000 | McCallister | 375/358 |
| 6,067,071 A * | 5/2000 | Kotha et al. | 345/132 |
| 6,067,319 A * | 5/2000 | Copeland | 375/232 |

OTHER PUBLICATIONS

Henry Samueli et al., "VLSI Architectures For A High-Speed Tunable Digital Modulator/Demodulator/BandPass-Filter Chip Set," Integrated Circuits and Systems Laboratory Electrical Engineering Dept. University of California Los Angeles (ISCAS '92), 4 pages.

* cited by examiner

*Primary Examiner*—Chi Pham
*Assistant Examiner*—Emmanuel Bayard
(74) *Attorney, Agent, or Firm*—Christie, Parker & Hale, LLP

(57) ABSTRACT

Digital data signals at a variable input frequency are converted by a numerically controlled oscillator and an interpolator to a signal at a fixed output sampling frequency. The conversion of the variable input frequency to the fixed output sampling frequency may be by a factor other than an integer. The interpolated digital data signals at the fixed output sampling frequency are then modulated into a pair of trigonometric signals at a programmable carrier frequency, one signal having a cosine function and the other signal having a sine function. The modulated signals at the fixed output sampling frequency are then combined to create a modulated signal at a carrier frequency determined by the frequency of the sine and cosine signals. The modulated signal is sampled at the fixed output sampling frequency and converted to a corresponding analog signal using a digital-to-analog converter.

24 Claims, 4 Drawing Sheets

VARIABLE RATE MODULATOR

CROSS REFERENCE TO RELATED APPLICATION

This application is a continuation of U.S. Pat. Ser. No. 08/948,101, filed Oct. 9, 1997 now U.S. Pat. No. 06/144,712, issued Nov. 7, 2000. The priority of this patent is hereby claimed under 35 U.S.C. § 120.

This application contains subject matter that is related to U.S. Pat. No. 6,421,396, issued Jul. 16, 2002.

This invention relates to a system including a variable rate modulator for (1) varying the rate at which signals are modulated in accordance with variations in the rate of introduction of digital data to the system and (2) for processing the modulated signals to provide output signals at a fixed sampling frequency.

BACKGROUND OF THE INVENTION

In recent years, a number of different applications have arisen in which digital signals representing data are processed and the processed signals are then converted to analog signals. For example, such applications have included the transmission of television signals through coaxial lines to homes. In such systems, the digital data is converted to analog signals and the analog signals are then transmitted through coaxial lines to homes of subscribers. Other applications are in microwave links and satellite communications.

In a number of the different applications involving the processing of digital data and the conversion of the processed digital data to analog signals, the digital data is provided at a variable input frequency or rate and the analog signals are provided at a fixed sampling frequency different from the variable input frequency or rate. For example, the digital data may be provided in the range of approximately 0.1–20 megabits per second and the analog signals may be sampled at a fixed frequency in the range of approximately 100–200 megahertz.

In the above example, the variable rate digital signals in the range of 0.1–20 megabits/second are converted to a modulated analog intermediate frequency signal having a fixed sampling frequency. For example, the digital signals in the range of 0.1–20 megabits/second may be converted to signals at a fixed sampling frequency of approximately 100–200 megahertz. The signals at the sampling frequency are then modulated onto a programmable carrier frequency in the range of approximately 5–65 MHz. at the fixed sampling frequency of approximately 100–200 megahertz.

As will be seen from the above discussion, a considerable range of frequencies (e.g. 0.1–20 megabits/second) have to be converted to a single fixed frequency (e.g. 120 megahertz). This is not easy. If the conversion is not accurate, the signals at the fixed sampling frequency jitter. When the signals illustratively provide television information, the jitter produces a significant deterioration in the quality of the television image.

BRIEF DESCRIPTION OF THE INVENTION

This invention provides a system for, and method of, converting digital data signals variable through a wide range of frequencies or rates into signals at a fixed sampling frequency. This conversion occurs without any jitter in the signals at the fixed sampling frequency. When the system of this invention is illustratively used to provide television images, the television images have a high resolution.

In one embodiment of the invention, digital data signals at a variable input frequency are converted by a numerically controlled oscillator and an interpolator to a signal at a fixed sampling frequency. The conversion of the variable input frequency to the fixed output sampling frequency may be by a factor other than an integer.

The interpolated digital data signals at the output sampling frequency are then modulated onto a pair of trigonometric signals at a programmable carrier frequency, one signal having a cosine function and the other signal having a sine function.

The modulated pair of trigonometrically related signals at the fixed sampling frequency are then combined to create a modulated signal at a carrier frequency determined by the frequency of the sine and cosine signals. The modulated signal is sampled at the fixed sampling frequency and converted to a corresponding analog signal using a digital-to-analog converter.

DETAILED DESCRIPTION OF THE INVENTION

Figure 1:
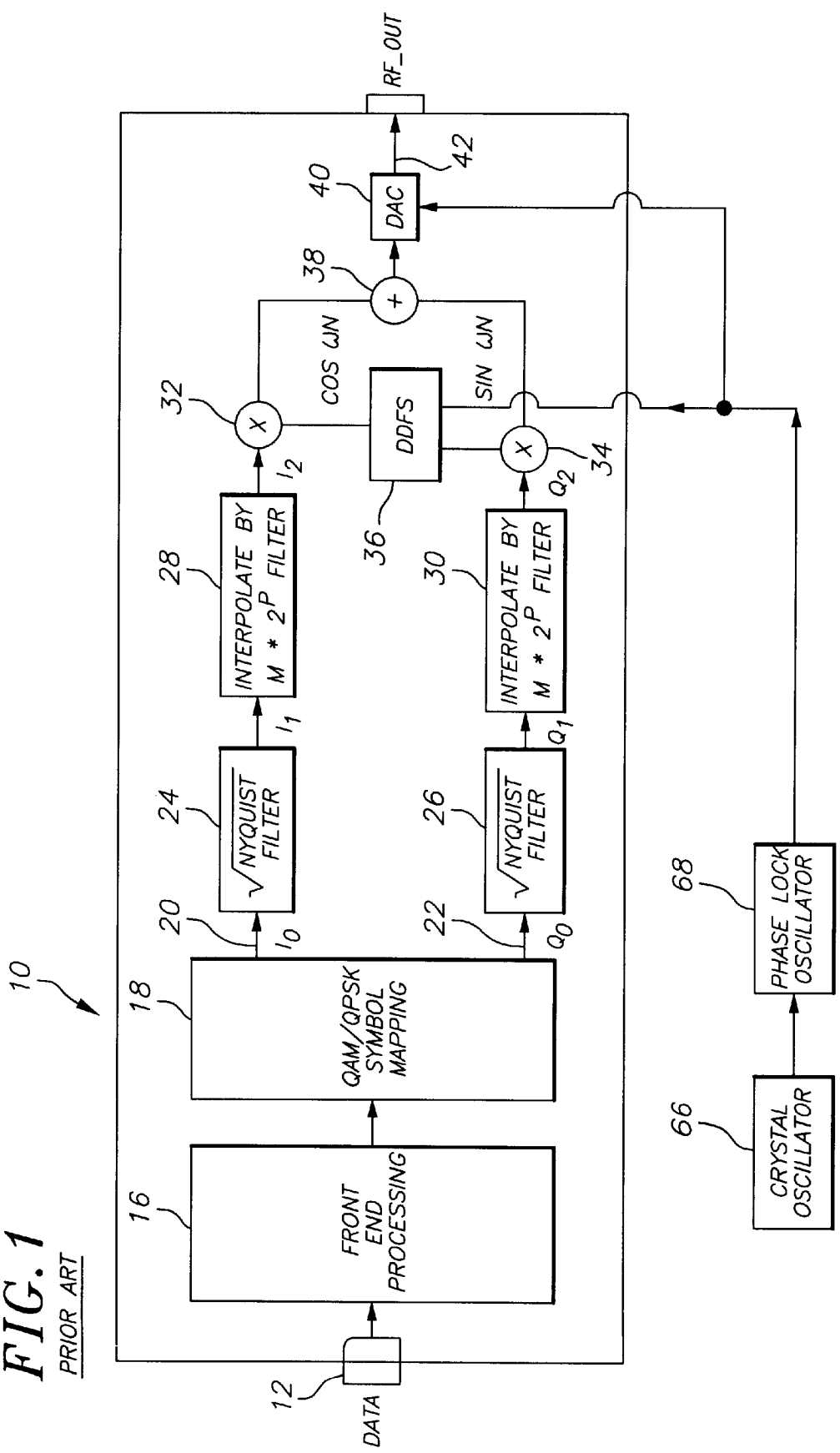
FIG. 1 is a circuit diagram, primarily in block form, of a system constituting an embodiment of the prior art.

FIG. 1 shows a system, generally indicated at 10, of the prior art for transmitting digital data at a variable frequency, for processing the digital data and for converting the digital data at a fixed sampling frequency to an analog signal. In the system 10, the digital data is provided at the variable frequency on a line 12. This variable frequency may vary through a range such as approximately 0.1–20 megabits per second. Several processing functions are then performed on the data in a well known manner and are indicated by a stage 16 designated as front-end processing. For example, these processing functions may include a data scrambler, a forward error correction encoder and a stage which inserts a preamble in the data stream to achieve synchronization at the receiver.

The signals from the stage 16 are then introduced to a stage 18 which may be constructed in a well known manner. The stage 18 is designated as QAM (quadrature amplitude modulation)/QPSK (quadrature phase shift keying) symbol mapping. The stage 18 operates upon the digital data signals from the stage 16 to produce signals having various amplitude levels, such as ±1 or ±3. Such signals with such amplitude levels are produced in such environments as coaxial television lines. Pairs of signals at such amplitude levels are produced by the stage 18. The signals from the stage 18 are respectively designated as $I_0$ & $Q_0$.

The output signals from the symbol mapping stage 18 on lines 20 and 22 are respectively introduced to square root Nyquist filters 24 and 26 which are well known in the art. The square root Nyquist filters constitute low pass filters. The signals from the stages 24 and 26, designated as $I_1$ & $Q_1$, respectively, are then respectively introduced to interpolation filters 28 and 30 which may also be constructed in a well known manner in the prior art embodiment shown in FIG. 1. Each of the filters 28 and 30 may constitute a plurality of stages each multiplying, by an integer, the sampling frequency of the signals introduced to it. For example, each of the filters 28 and 30 may constitute P stages each operative to multiply by the integer 2 the sampling frequency of the signals introduced to it.

Thus, the interpolation filters 28 and 30 may multiply the sampling frequency of the signals by a value $M*2^P$. In the above equation, M may constitute an integer by which one of the stages in each of the interpolation filters 28 and 30 multiplies the sampling frequency. The interpolation filters 28 and 30 respectively provide signals designated as $I_2$ and $Q_2$.

The signals from the interpolation filters 28 and 30, respectively designated $I_2$ and $Q_2$, are respectively introduced to multipliers 32 and 34. The multipliers also receive signals from a direct digital frequency synthesizer (DDFS) 36 which provides cosine and sine signals at a frequency which may be considered to constitute a carrier frequency. The cosine and sine signals introduced to the multipliers 32 and 34 from the synthesizer 36 are respectively multiplied with the signals $I_2$ and $Q_2$ from the filters 28 and 30. The multipliers 32 and 34 respectively modulate the $I_2$ and $Q_2$ signals from the filters 28 and 30 onto the carrier frequency of the signals from the frequency synthesizer 36. This carrier frequency is programmable and may be in the range of approximately 5–65 megahertz.

The modulated signals from the multipliers 32 and 34 pass to an adder 38. The resultant signal from the adder 38 is converted to an analog signal in a digital-to-analog converter 40 and the analog signal is introduced to an output line 42. As will be seen from the subsequent discussion, the signals from the frequency synthesizer 36 are at a fixed sampling frequency and the signals from the adder 38 are sampled at this fixed sampling frequency to produce an analog signal.

As previously indicated, the data signal on the line 12 has a variable input frequency. The signals from the interpolation filters 28 and 30 preferably have a fixed output sampling frequency. As will be apparent, the interpolation filters 28 and 30 cannot provide a fixed output sampling frequency when the signals on the lines 20 and 22 have a variable input frequency and the interpolation filters 28 and 30 provide sampling frequency multiplication by integer numbers. This has accordingly provided serious operational limitations in the prior art. For example, it has introduced jitters into the signals at the output sampling frequency from the interpolate filters 28 and 30 and thus has produced jitters at the output line 42. When the signals at the output line 42 constitute television signals, the television signals have accordingly been blurred.

This invention provides a system for, and methods of, maintaining the frequency of the signals introduced to the stages 32 and 34 fixed even when the rate or frequency of the data signals 12 varies over a range as high as approximately 0.1–20 megabits per second. The system of this invention is generally indicated at 48 in FIG. 2. The system 48 is identical to the system 10 of FIG. 1 except that it includes interpolation filters 50 and 52 each of which includes a plurality of stages and each of which is intended to be substituted for a corresponding one of the filters 28 and 30 in FIG. 1.

All of the stages in the filters 50 and 52 (except the last stage) interpolate by an integer such as a value of 2. For example, there may be stages each of which interpolates by a value of 2 or 3. The last stage interpolates by a value which may or may not be an integer. This value may be represented by M/N where M and N are integers. By providing an interpolation ratio of M/N, the filters 50 and 52 can provide signals at the desired fixed output sampling frequency such as 120 megahertz even when the input sampling frequency can vary in the range of approximately 0.1–20 megahertz.

Figure 3:
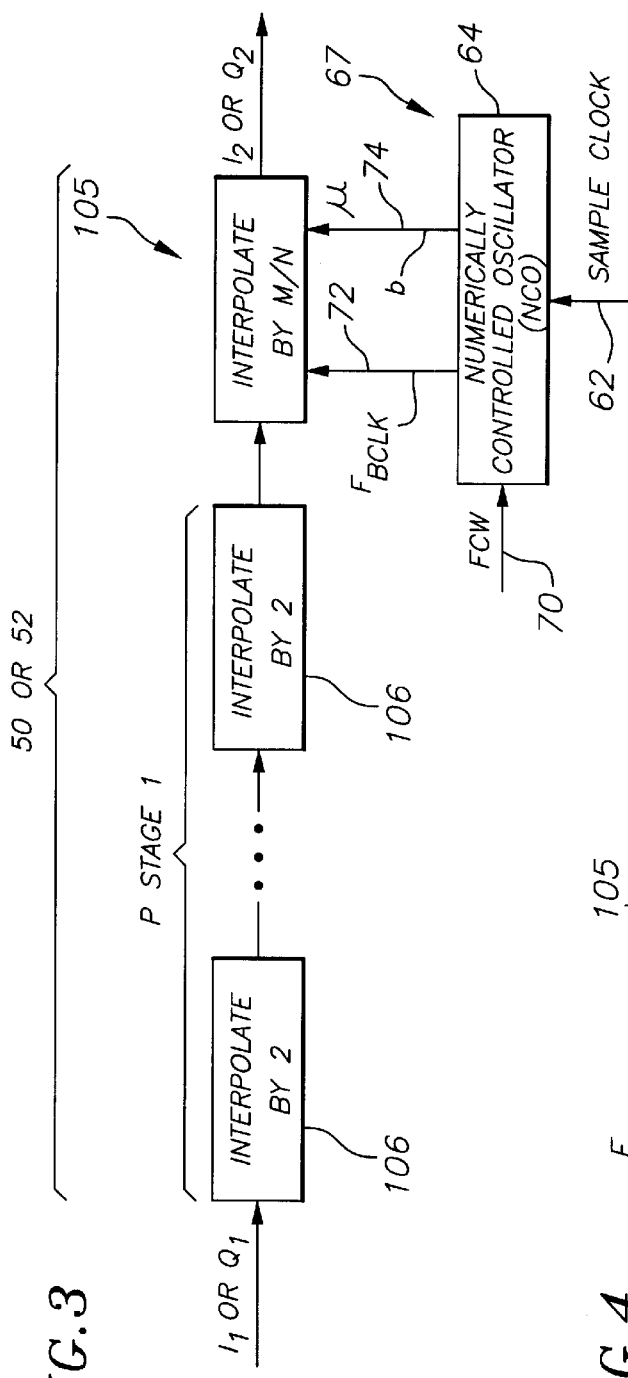
FIG. 3 is a circuit diagram, primarily in block form, of certain features included in the system constituting one embodiment of this invention to provide the, significant difference between the system of this invention and the system of the prior art.

The last interpolation stage in the system of this invention is indicated generally at 67 and 105 in FIG. 3. It includes a numerically controlled oscillator 64. The oscillator 64 may be considered to be the digital equivalent of a voltage controlled oscillator in that it provides oscillatory signals at a variable frequency dependent upon digital inputs to the oscillator. The construction and operation of numerically controlled oscillators such as the oscillator 64 are well known in the art.

Figure 2:
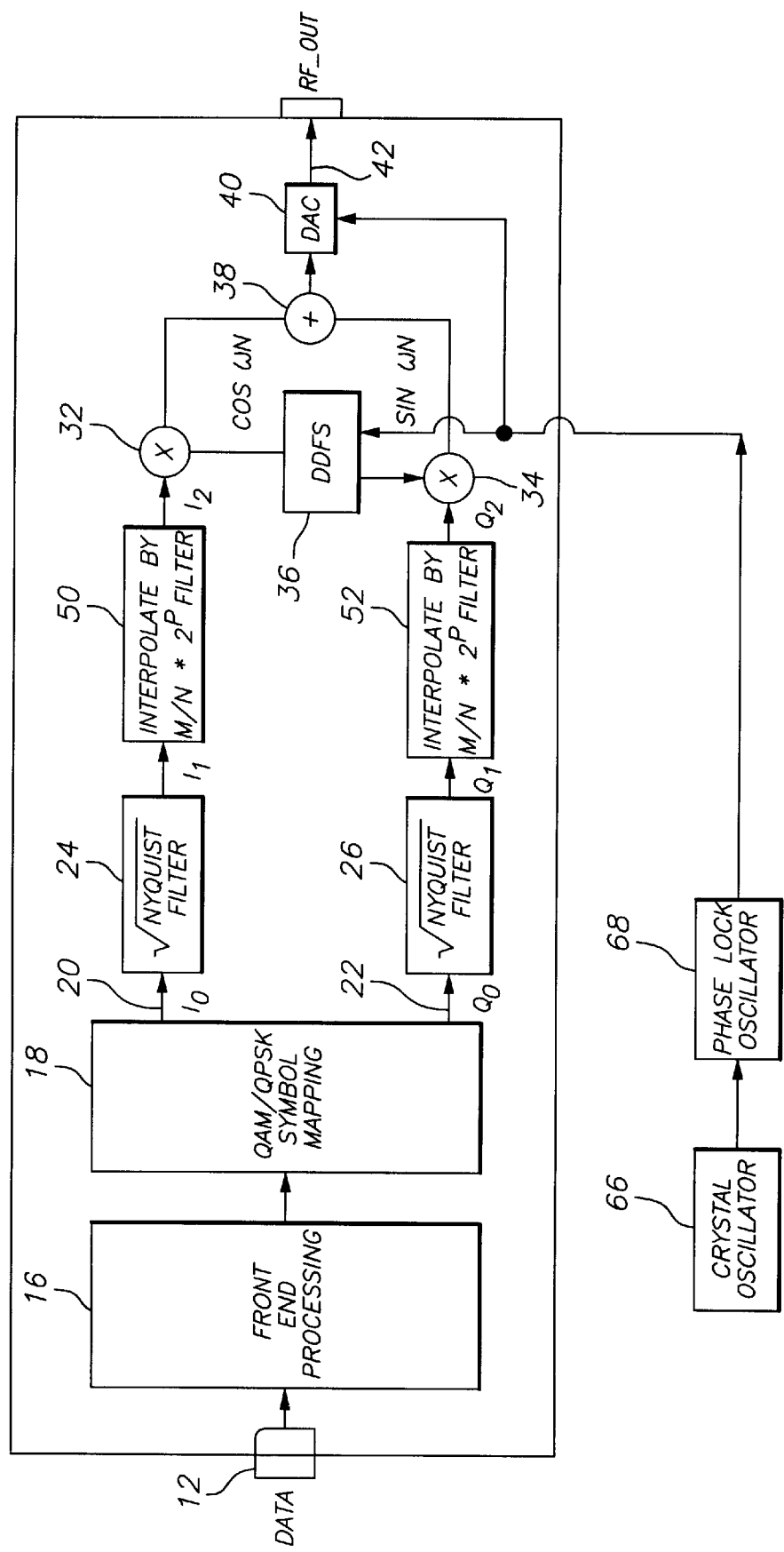
FIG. 2 is a circuit diagram, primarily in block form, of a portion of the system similar to that shown in FIG. 1 and shows a significant difference between the system of this invention and the system of the prior art.

The numerically controlled oscillator 64 receives several inputs. For example, the numerically controlled oscillator 64 receives a clock signal at affixed frequency on a line 62 such as a signal from the crystal oscillator 66 (FIGS. 1 and 2). The frequency of the signal from the oscillator 66 can be multiplied by a phase lock loop such as the phase lock loop 68 (FIGS. 1 and 2) well known in the art. The signals at the multiplied frequency from the phase lock loop 68 are introduced to the direct digital frequency synthesizer (DDFS) 36 and to the digital-to-analog converter 40 shown in FIGS. 1 and 2. The frequency of such signals may be represented as $F_{SAMPLE-CLK}$.

The numerically controlled oscillator 64 also receives input signals from a line 70. These signals may be designated as a frequency control word (FCW). The line 70 provides control signals FCW so that output clock signals can be provided on a line 72 at a substantially constant frequency represented by the FCW and corresponds to the baud or symbol rate of the input data 80. This frequency may be designated as $F_{BCLK}$.

Output signals are also provided from the numerically controlled oscillator 64 on a line 74. The output signals on the line 74 represent a value $\mu$ greater than or equal to 0 and less than 1. This value will be described in detail subsequently. For the time being, it may be considered to represent the phase offset between the sample clock on the line 62 and the $F_{BCLK}$ signal on the line 72. The value $\mu$ changes on every sample clock cycle.

$F_{BCLK}$ on the line 72 may be represented as $$F_{BCLK} = \frac{FCW}{2^B} \times F_{SAMPLE\_CLK} \text{ where} \tag{1}$$

B = a fixed number such as twenty four (24) bits.

Equation 1 may be converted to

-continued $$F_{BCLK} = \frac{M}{N} \times F_{\text{SAMPLE\_CLK}} \text{ where} \quad (2)$$

M may be considered as equal to FCW and

N may be considered as equal to $2^B$.

The value M = FCW may be then represented as $$M = \frac{(F_{BCLK})(N)}{F_{\text{SAMPLE\_CLK}}}. \quad (3)$$

In this way, the operation of the numerically controlled oscillator 64 is varied so that the proper value of FCW on line 70 is provided to obtain the value of $F_{BCLK}$ at the output of the oscillator.

Figure 4:
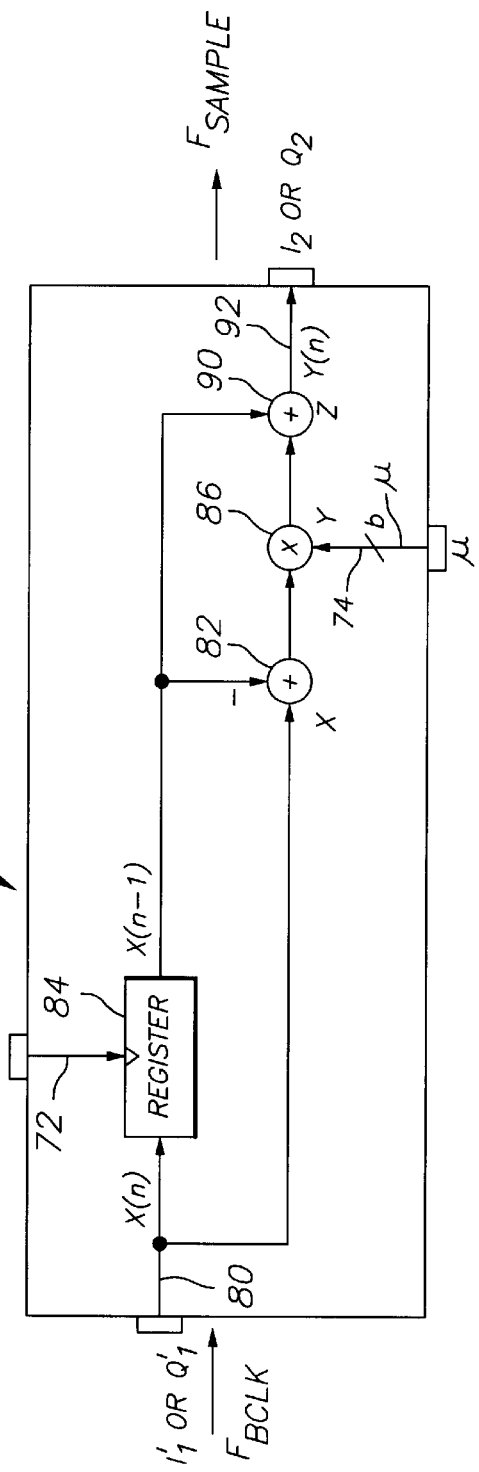
FIG. 4 is a circuit diagram, primarily in block form, of other features included in the system constituting one embodiment of this invention to provide the significant difference between the system of this invention and the system of the prior art.

FIG. 4 illustrates an example of the interpolation filter 105 in FIG. 3. The output from the last, by way of example, interpolate-by-2 stage 106 in FIG. 3 is introduced at 80 to an adder 82 and the input terminal of a register 84 in FIG. 4. The register 84 is clocked by the output signal $F_{BCLK}$ on the line 72 from the numerically controlled oscillator 64 in FIG. 3. The negative value of the output from the register 84 is also introduced to the adder 82 in FIG. 4.

The adder 82 accordingly provides an output represented as $$x(n)-x(n-1) \text{ where} \quad (4)$$

x(n) represents the current input sample on the line 80 and x(n-1) represents the previous input sample on such line. The value of x(n)-x(n-1) is then multiplied in the multiplier 86 to provide a value of $\mu[x(n)-x(n-1)]$.

As previously indicated, $\mu$ is a value greater than or equal to 0 and less than 1. It constitutes the difference in phase between the sample clock 62 and the BCLK signal on the line 72 in FIG. 3. For example, the significance of $\mu$ may be seen from the following illustrative relationship between the fixed output sample clock signal on the line 62 and the variable rate clock signal $F_{BCLK}$ on the line 72:

$$F_{72}=\frac{1}{4}F_{62} \text{ where} \quad (6)$$

$F_{72}$=the frequency of the clock on the line 72 and $F_{62}$=the frequency of the sample clock on the line 62. In successive clock signals, $\mu$ will then be 0, ¼, ½, ¾, 0, ¼, ½, etc. The $\mu$ signal on the line 74 and the output from the adder 82 are multiplied in the multiplier 86 in FIG. 4. The output from the multiplier 86 passes to an adder 90 which also receives the output x(n-1) from the register 84 to provide an output on a line 92 of $$y(n)=x(n-1)+\mu[x(n)-x(n-1)] \quad (5)$$

where y(n) is an interpolated value between x(n) and x(n-1).

Figure 5:
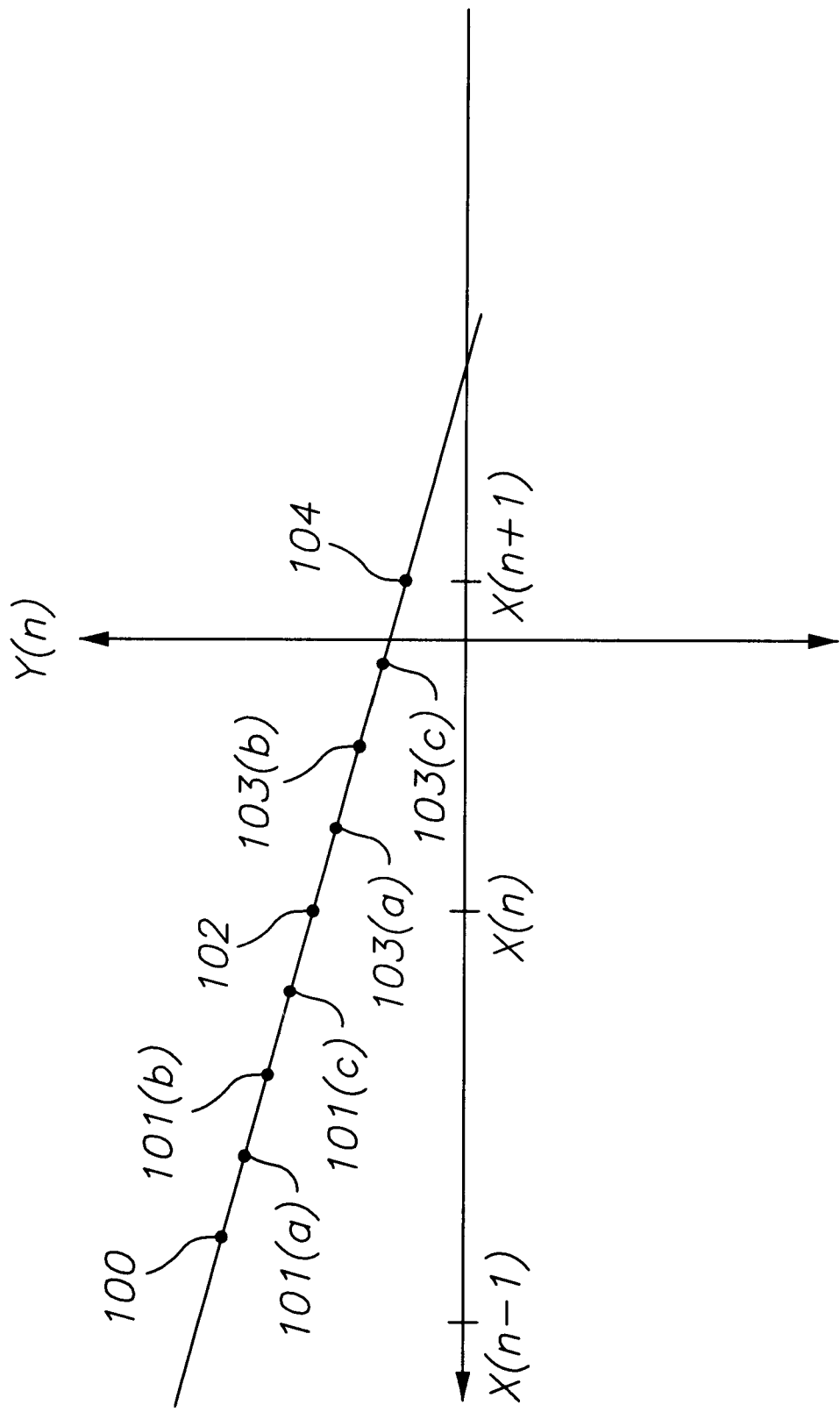
FIG. 5 shows a curve illustrating how the system of this invention provides a linear interpolation between successive values introduced to the system, thereby enhancing the resolution by the system of this invention of the image represented by the data signals introduced to the system.

FIG. 5 illustrates at 100, 102, and 104 the data signals on the line 80. FIG. 5 also illustrates at 101a, 101b and 101c the signals interpolated between the input signals 100 and 102 and at 103a, 103b and 103c the signals interpolated between the input signals 102 and 104. The interpolated signals 101a, 101b and 101c and the interpolated signals 103a, 103b and 103c are provided when $\mu$=¼, ½, ¾ as discussed above.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A signal processing system, comprising:
   a clock providing a first clock signal at a first clock frequency;
   a numerically controlled oscillator responsive to a frequency control signal and the first clock signal for providing an output clock signal at a fixed second clock frequency, and a phase offset signal representing an offset in phase between the first clock signal and the second clock signal, and
   an interpolator that offsets a pair of variable frequency input signals in accordance with the phase offset signal to provide an interpolated signal at a fixed output sampling frequency.

2. The signal processing system of claim 1 wherein the phase offset signal is greater than or equal to zero and less than one.

3. The signal processing system of claim 1 wherein the interpolator interpolates the variable frequency input signal by a non-integer value.

4. The signal processing system of claim 1 wherein the interpolator interpolates the variable frequency input signal by an integer value.

5. The signal processing system of claim 1 further comprising a modulator for modulating the interpolated signal onto a trigonometric signal at a carrier frequency.

6. The signal processing system of claim 5 further comprising a digital to analog converter for converting the modulated signal to an analog signal.

7. The signal processing system of claim 1 wherein said interpolator includes a register, responsive to said second clock signal, to provide said pairs of variable frequency input signals.

8. A signal processing system comprising:
   a symbol mapper for converting binary data bits to a pair of data signals at a variable frequency having an amplitude and phase that represents the binary data bits;
   a clock providing a first clock signal at a first clock frequency;
   a numerically controlled oscillator responsive to a control signal and the first clock signal for providing a second clock signal at a fixed second clock frequency, and a phase offset signal representing an offset in phase between the first clock signal and the second clock signal;
   an interpolator that offsets a pair of variable frequency input signals in accordance with the phase offset signal to provide interpolated signals at a fixed sampling frequency;
   a modulator that modulates the interpolated signals onto trigonometric signals;
   an operator that combines the modulated signals; and
   a digital to analog converter that converts the combined modulated signal to an analog signal.

9. A method of converting a variable frequency input signal to a fixed frequency output signal comprising:
   generating a first clock signal at a first clock frequency;
   receiving a frequency control signal that corresponds to a second frequency;
   generating a second clock signal at the second frequency as a function of said frequency control signal;
   generating a phase offset signal representing an offset in phase between the first clock signal and the second clock signal; and offsetting a pair of variable frequency data signals in accordance with said phase offset signal to generate an output signal at a fixed sampling frequency.

10. The method of claim 9 further comprising:

modulating the interpolated signal onto trigonometric signals; and converting the modulated signal to an analog signal.

11. A signal processing system, comprising:

a numerically controlled oscillator responsive to a frequency control signal and a first clock signal at a first clock frequency; for providing a second clock signal at a fixed second clock frequency, and, for providing a phase offset signal representing an offset in phase between the first clock signal and the second clock signal, and an interpolator that offsets a pair of variable frequency input signals in accordance with the phase offset signal to provide an interpolated signal at a fixed sampling frequency.

12. A signal processing system comprising:

a symbol mapper for converting binary data bits to a pair of data signals at a variable frequency having an amplitude and phase that represents the binary data bits;

a numerically controlled oscillator responsive to a control signal and a first clock signal at a first clock frequency for providing a second clock signal at a fixed second clock frequency, and a phase offset signal representing an offset in phase between the first clock signal and the second clock signal;

an interpolator that offsets a pair of variable frequency input signals in accordance with the phase offset signal to provide interpolated signals at a fixed sampling frequency;

a modulator that modulates the interpolated signals onto trigonometric signals;

an operator that combines the modulated signals; and a digital to analog converter that converts the combined modulated signal to an analog signal.

13. A method of converting a variable frequency input signal to an output signal having a fixed output frequency, comprising:

generating a clock signal at a clock frequency equal to baud rate of said input signal as a function of a received frequency control signal;

generating a phase offset signal representing an offset in phase between a recipient clock signal and the clock signal; and offsetting a pair of variable frequency data signals in accordance with said phase offset signal to generate an output signal at a fixed sampling frequency.

14. A digital resampler comprising:

an interpolator responsive to a symbol clock and a phase offset signal representing an offset in phase between a sample clock at a fixed sampling frequency and said symbol clock, wherein said interpolator offsets a pair of variable frequency input signals in accordance with said symbol clock and phase offset signal to provide an interpolated signal at said fixed sampling frequency.

15. The signal processing system of claim 14 wherein said interpolator comprises a register, responsive to said symbol clock, to provide said pairs of input signals offset by said interpolator.

16. A signal processing system, comprising:

a clock providing a first clock signal at a first clock frequency;

a numerically controlled oscillator responsive to a frequency control signal and the first clock signal for providing a second clock signal at a fixed second clock signal, and a phase offset signal representing an offset in phase between the first clock signal and the second clock signal, and a linear interpolator responsive to the phase offset signal for converting a variable frequency input signal to an interpolated signal at a fixed sampling frequency.

17. The signal processing system of claim 16 wherein the interpolator provides offsets between a pair of variable frequency input signals in accordance with the phase offset signal.

18. The signal processing system of claim 17 wherein the phase offset signal is greater than or equal to zero and less than one.

19. A signal processing system, comprising:

a clock providing a sample clock signal at a sample clock frequency;

a numerically controlled oscillator responsive to a frequency control signal and the sample clock signal for providing an output clock signal at a fixed output sampling rate, and a phase offset signal representing an offset in phase between the sample clock signal and the output clock signal, and a linear interpolator that provides offsets between a variable frequency input signal at a first time and a second time in accordance with the phase offset signal to convert provides offsets between a pair of variable frequency input signals in accordance with the phase offset signal the variable frequency input signal to an interpolated signal at a fixed sampling frequency.

20. The signal processing system of claim 19 wherein said linear interpolator comprises a plurality of interpolation stages and wherein at least one of said interpolation stages comprises a non-integer interpolation stage.

21. The signal processing system of claim 19 wherein said interpolator comprises a register, responsive to said output clock signal, to provide said input signal at said first time and second time.

22. The signal processing system of claim 21 further comprising a modulator for modulating the interpolated signal onto a trigonometric signal at a carrier frequency.

23. The signal processing system of claim 22 further comprising an digital to analog converter for converting modulated signal to an analog signal.

24. The signal processing system of claim 19 wherein said linear interpolator comprises a plurality of interpolation stages and wherein at least one of said interpolation stages comprises a register coupled to said variable rate input signal, wherein said register is clocked by said output clock signal at said fixed output sampling rate to provide said input signal at said first time and second time, a difference operator coupled to output of said register and said variable rate input signal, a multiplier coupled to the output of said difference operator for scaling the output of the difference operator in accordance with said phase offset signal and an adder coupled to the output of said register and output of said multiplier for providing said interpolated signal at a Axed sampling frequency.

* * * * *

UNITED STATES PATENT AND TRADEMARK OFFICE
CERTIFICATE OF CORRECTION

PATENT NO.    : 6,498,823 B1                                              Page 1 of 1
DATED         : December 24, 2002
INVENTOR(S)   : Samueli et al.

It is certified that error appears in the above-identified patent and that said Letters Patent is hereby corrected as shown below:

Drawings
FIG. 4, Sheet 3 of 4, delete "$^F$BCLK", insert -- BCLK --

Column 8,
Line 63, delete "Axed sampling frequency", insert -- fixed sampling frequency --

Signed and Sealed this

First Day of March, 2005

JON W. DUDAS
*Director of the United States Patent and Trademark Office*